(12) United States Patent
Tomita et al.

(10) Patent No.: US 8,607,164 B2
(45) Date of Patent: Dec. 10, 2013

(54) IMAGE PROCESSING APPARATUS, METHOD OF CONTROLLING DISPLAY OF FUNCTION BUTTON, AND RECORDING MEDIUM

(75) Inventors: Atsushi Tomita, Toyohashi (JP); Kenichi Sawada, Toyohashi (JP); Takuya Okada, Toyokawa (JP); Takeshi Hibino, Toyokawa (JP); Takatsugu Kuno, Toyokawa (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 289 days.

(21) Appl. No.: 12/978,780

(22) Filed: Dec. 27, 2010

(65) Prior Publication Data

US 2011/0161881 A1    Jun. 30, 2011

(30) Foreign Application Priority Data

Dec. 29, 2009   (JP) ................................ 2009-299228

(51) Int. Cl.
 *G06F 3/048*   (2013.01)
 *G06F 3/12*    (2006.01)
 *H04N 1/40*    (2006.01)

(52) U.S. Cl.
 USPC ........... 715/825; 715/822; 715/823; 715/824; 715/826; 715/827; 715/828; 715/829; 358/1.13; 358/1.15; 358/448

(58) Field of Classification Search
 USPC .......... 715/822–829; 358/80, 474, 1.13, 1.15, 358/448
 See application file for complete search history.

(56) References Cited

U.S. PATENT DOCUMENTS

| | | | | |
|---|---|---|---|---|
| 2005/0260009 | A1* | 11/2005 | Namizuka et al. | 399/80 |
| 2007/0008573 | A1* | 1/2007  | Yamada | 358/1.15 |
| 2007/0216965 | A1* | 9/2007  | Yoshihama | 358/474 |

FOREIGN PATENT DOCUMENTS

| | | |
|---|---|---|
| JP | 2002-361986 A | 12/2002 |
| JP | 2006-5910 A | 1/2006 |
| JP | 2007-20030 A | 1/2007 |
| JP | 2007-249863 A | 9/2007 |
| JP | 2008-276399 | 11/2008 |
| JP | 2009-009382 | 1/2009 |

* cited by examiner

*Primary Examiner* — Boris Pesin
*Assistant Examiner* — Rinna Yi
(74) *Attorney, Agent, or Firm* — Buchanan Ingersoll & Rooney PC

(57) ABSTRACT

An image processing apparatus comprising: a display; a controller that displays or hides a function button for use of a function on a display screen on the display according to one or more than one pattern information object indicating the setting whether to display or hide the function button on the display screen; a firmware updater that updates firmware; and a comparator that compares the old and new firmware in terms of the functions installed thereon, and wherein, if the comparison result drawn by the comparator indicates that a new function is added due to the firmware update, the controller displays or hides a first function button for use of the new function according to pattern information for a second function button for use of a function on a higher layer than the new function or pattern information for a group including the second function button.

21 Claims, 14 Drawing Sheets

| Function | Higher-layer Function |
|---|---|
| 1 | — |
| 2 | 1 |
| 3 | 1 |
| 4 | 2 |
| ⋮ | ⋮ |

FIG.6a

| | Basic | Standard |
|---|---|---|
| Function 1 | ○ | ○ |
| Function 2 | ○ | × |
| Function 3 | × | ○ |
| ⋮ | ⋮ | ⋮ |

FIG.6b

IMAGE PROCESSING APPARATUS, METHOD OF CONTROLLING DISPLAY OF FUNCTION BUTTON, AND RECORDING MEDIUM

This application claims priority under 35 U.S.C. §119 to Japanese Patent Application No. 2009-299228 filed on Dec. 29, 2009, the entire disclosure of which is incorporated herein by reference in its entirety.

BACKGROUND OF THE INVENTION

1. Field of the Invention

The present invention relates to: an image processing apparatus such as an image forming apparatus, which allows users to perform customization so that a function button for use of a function can be displayed or hidden on a screen of a display of an operation panel for example; a method of controlling the display of a function button; and a computer-readable recording medium having a program for controlling the display of a function button, stored thereon to make a computer execute processing.

2. Description of the Related Art

The following description sets forth the inventor's knowledge of related art and problems therein and should not be construed as an admission of knowledge in the prior art.

Conventionally, for the purpose of improving user operability, there have been suggested or disclosed some technologies about an image processing apparatus having an operation panel with a little ingenuity in its display.

For example, as disclosed in Unexamined Patent Publications No. 2002-361986 and No. 2007-249863, there has been the technology to perform customization so that an unnecessary function can be hidden or displayed grayed-out on an operation portion.

As further disclosed in Unexamined Patent Publication No. 2006-005910, there has been the technology to perform customization based on information from an ID card for example, so that a function not installed on a MFP (Multi Function Peripheral) that is a multifunctional digital machine can be downloaded with use of an operation portion of the MFP.

As further disclosed in Unexamined Patent Publication No. 2007-020030, there has been the technology to download a function not installed on a machine.

With the increase of range of functions, an image processing apparatus of recent years has an operation panel with more operation buttons provided thereon for multiple purposes, which are organized by function category.

In order to allow end-users to use only some limited functions, an office administrator, a shop owner having a multifunctional machine at office or an administrator having a multifunctional machine at public facility, sometimes hides an arbitrary setting screen or function button with use of an operation panel.

However, if a new function on a lower layer than a screen or a button to be hidden in accordance with a prior setting by user is added to the machine due to firmware update i.e. updating firmware, which is software installed on the machine for basic hardware control; due to firmware copy i.e. copying firmware from hardware installed on a different machine; or due to function update, the function button for use of the new function will be hidden in conflict with the prior setting, which has been a problem.

Meanwhile, if a plurality of multifunctional machines having a difference in their functions are provided, there is the need to customize the positions of function buttons depending on their functions.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

The preferred embodiments of the present invention have been developed in view of the above-mentioned and/or other problems in the related art. The Preferred embodiments of the present invention can significantly improve upon existing methods and/or apparatuses.

It is an object of the present invention to provide an image processing apparatus that is capable of displaying/hiding a screen or a function button in accordance with a prior setting by user, if a new function on a lower layer than the screen or the function button is added to the image processing apparatus due to firmware update, firmware copy or function update.

It is another object of the present invention to provide a method of controlling the display of a function button, which is capable of displaying/hiding a screen or a function button in accordance with a prior setting by user, if a new function on a lower layer than the screen or the function button is added to the image processing apparatus due to firmware update, firmware copy or function update.

It is yet another object of the present invention to provide a computer-readable recording medium having a program for controlling the display of a function button, stored thereon to make a computer of the image processing apparatus execute processing.

According to a first aspect of the present invention, an image processing apparatus includes:

a display;

a controller that displays or hides a function button for use of a function on a display screen on the display according to one or more than one pattern information object indicating the setting whether to display or hide the function button on the display screen;

a firmware updater that updates firmware; and a comparator that compares the old and new firmware in terms of the functions installed thereon, and wherein:

if the comparison result drawn by the comparator indicates that a new function is added due to the firmware update, the controller displays or hides a first function button for use of the new function according to pattern information for a second function button for use of a function on a higher layer than the new function or pattern information for a group including the second function button.

According to a second aspect of the present invention, an image processing apparatus includes:

a display;

a controller that displays or hides a function button for use of a function on a display screen on the display according to one or more than one pattern information object indicating the setting whether to display or hide the function button on the display screen; and a pattern information copier that copies the pattern information objects from a different image processing apparatus, and wherein:

if there is a function installed on the image processing apparatus, which doesn't match any of the pattern information objects copied by the pattern information copier, the controller displays or hides a first function button for use of this unmatched function according to pattern information for a second function button for use of a function on a higher layer than this unmatched function.

According to a third aspect of the present invention, a method of controlling the display of a function button, includes:

displaying or hiding a function button for use of a function on a display screen on a display according to one or more than one pattern information object indicating the setting whether to display or hide the function button on the display screen;

updating firmware; and comparing the old and new firmware in terms of the functions installed thereon, and wherein:

if the comparison result indicates that a new function is added due to the firmware update, then a first function button for use of the new function is displayed or hidden according to pattern information for a second function button for a function on a higher layer than the new function or pattern information for a group including the second function button.

According to a fourth aspect of the present invention, a method of controlling the display of a function button, includes:

displaying or hiding a function button for use of a function on a display screen on a display according to one or more than one pattern information object indicating the setting whether to display or hide the function button on the display screen; and copying the pattern information objects from a different image processing apparatus, and wherein:

if there is a function installed on the image processing apparatus, which doesn't match any of the pattern information objects copied from the different image processing apparatus, a first function button for use of this unmatched function is displayed or hidden according to pattern information for a second function button for use of a function on a higher layer than this unmatched function.

According to a fifth aspect of the present invention, a computer-readable recording medium having a program for controlling the display of a function button, stored thereon to make a computer of an image processing apparatus execute:

displaying or hiding a function button for use of a function on a display screen on a display according to one or more than one pattern information object indicating the setting whether to display or hide the function button on the display screen;

updating firmware; and comparing the old and new firmware in terms of the functions installed thereon, and wherein:

if the comparison result indicates that a new function is added due to the firmware update, then a first function button for use of the new function is displayed or hidden according to pattern information for a second function button for use of a function on a higher layer than the new function or pattern information for a group including the second function button.

According to a sixth aspect of the present invention, a computer-readable recording medium having a program for controlling the display of a function button, stored thereon to make a computer of an image processing apparatus execute:

displaying or hiding a function button for use of a function on a display screen on a display according to one or more than one pattern information object indicating the setting whether to display or hide the function button on the display screen; and copying the pattern information objects from a different image processing apparatus, and wherein:

if there is a function installed on the image processing apparatus, which doesn't match any of the pattern information objects copied from the different image processing apparatus, a first function button for use of this unmatched function is displayed or hidden according to pattern information for a second function button for use of a function on a higher layer than this unmatched function.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which:

FIG. 6 is a view showing an example of pattern information;

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Hereinafter, one embodiment of the present invention will be described.

Figure 1:
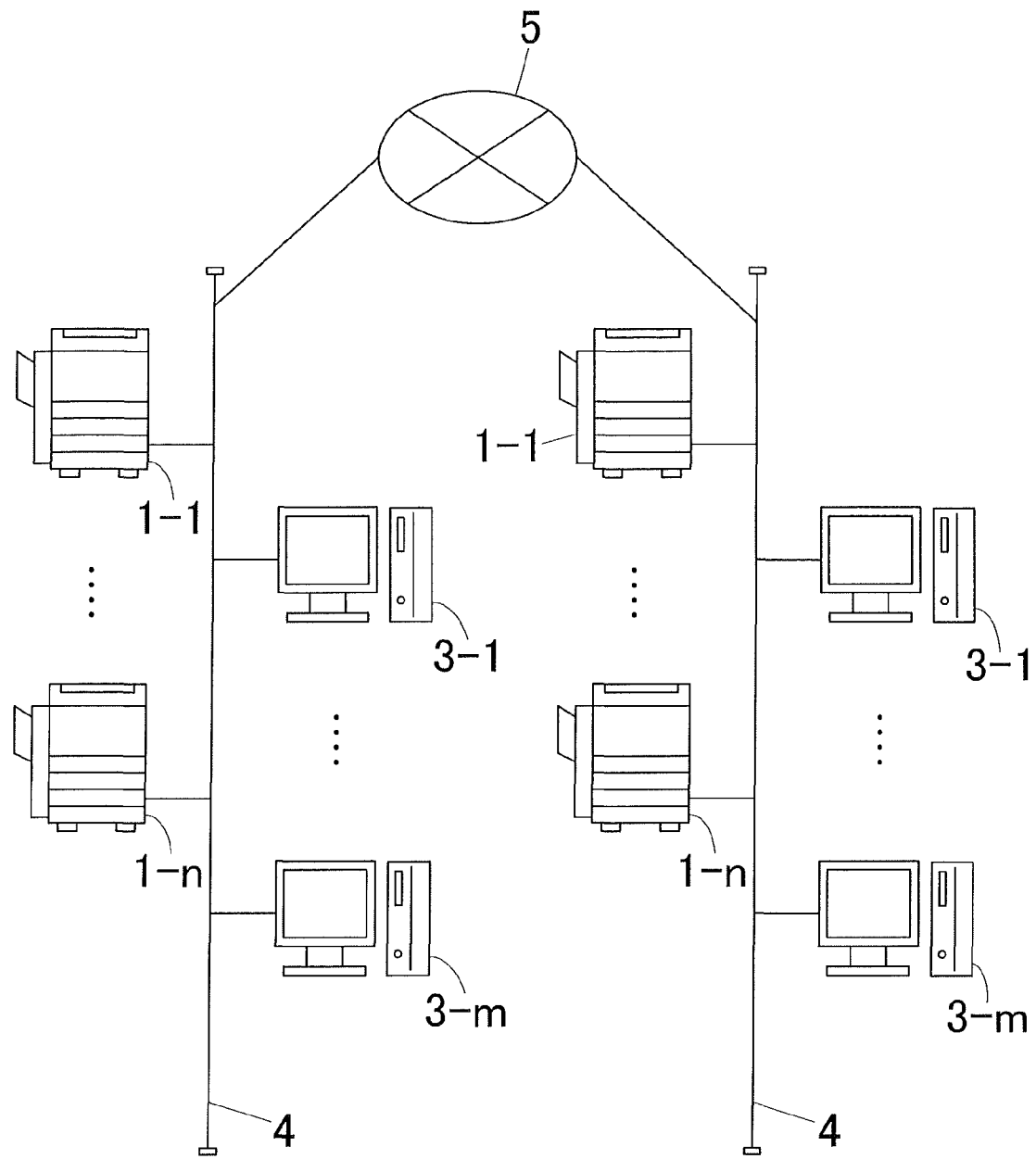
FIG. 1 is a view showing a frame format of an image forming system including some image forming apparatuses according to one embodiment of the present invention.

FIG. 1 is an explanatory view of a configuration of a system including an image forming apparatus that is an image processing apparatus according to one embodiment of the present invention.

This system includes an image forming apparatus 1-x (x: 1~n) and an information processing apparatus 3-y (y: 1~m). The image forming apparatus 1-x and the information processing apparatus 3-y are connected to each other via a network 4.

The network 4 may be a dedicated line for example a LAN (Local Area network), a public line or a wireless communication line.

The network 4 is connected to another network via an external network 5.

The image forming apparatus 1-x forms on paper an image read out from a document and an image copied from another image that is generated based on print data received from the information processing apparatus 3-y. The print data corresponds to: a draw command in a page description language so that the image forming apparatus 1-x can process the command, which is obtained by a printer driver, converting another draw command issued by an operating system or an application program of the information processing apparatus 3-y; or document data in a file format such as PDF, TIFF, JPEG or XPS.

Meanwhile the image read out from a document may be transmitted to the information processing apparatus 3-y and also other image forming apparatuses, via the network 4. Or alternatively, it may be transmitted to other image forming apparatuses and information processing apparatuses connected to another network, via the external network 5.

The information processing apparatus 3-y is a commonly used computer-controller machine, which includes a CPU, a RAM, a fixed recording medium (hard disk drive for example), a monitor, a keyboard, a mouse and etc. connected to each other. The information processing apparatus 3-y generates print data according to a user instruction and transmits the generated print data to the image forming apparatus 1-x.

Figure 2:
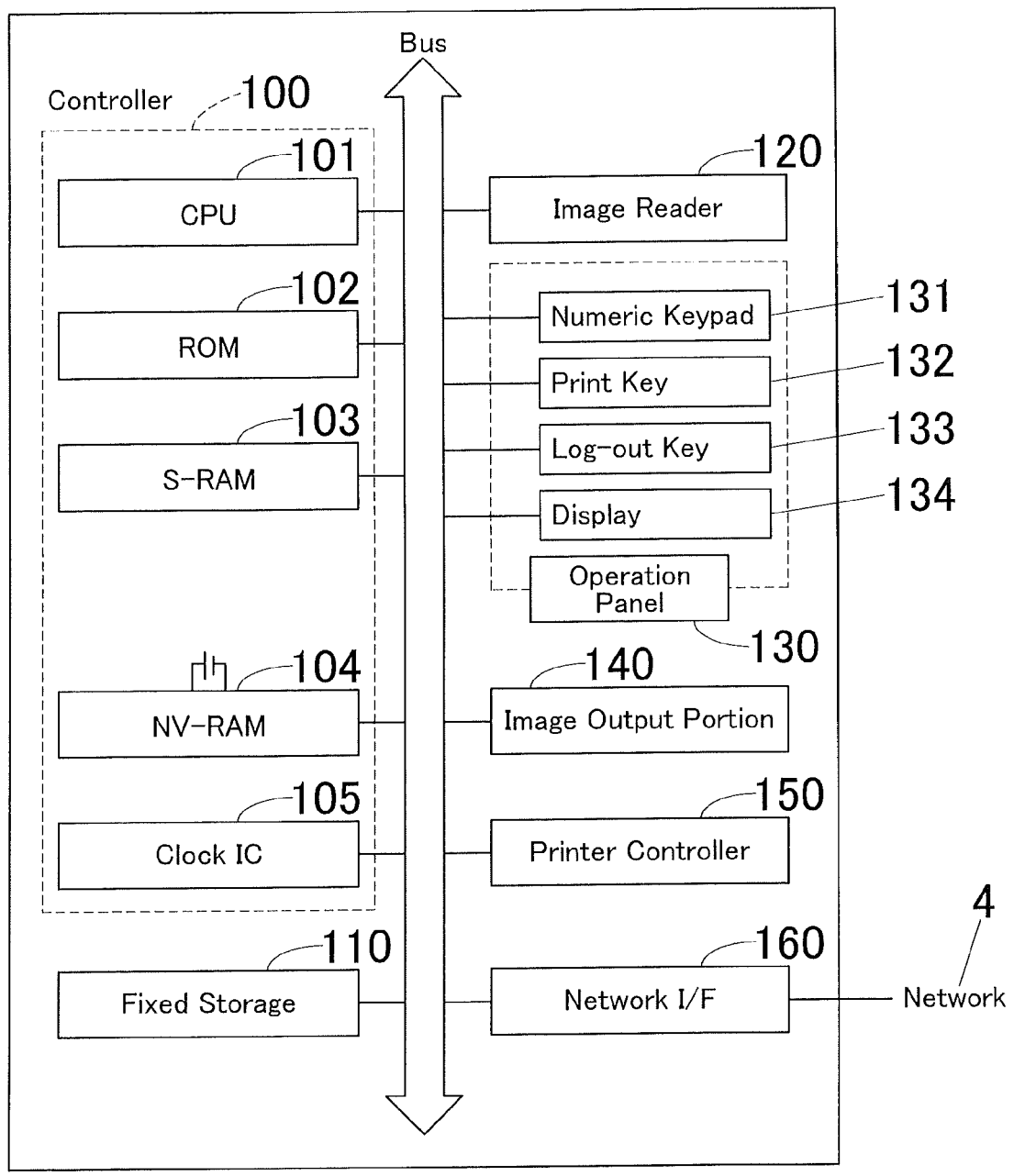
FIG. 2 is a view showing an internal configuration of the image forming apparatuses illustrated in FIG. 1.

FIG. 2 is a view showing an internal configuration of the image forming apparatus 1-x. A controller 100 of the image forming apparatus 1-x includes a CPU 101, a ROM 102 storing a control program, a S-RAM (Static Random Access Memory) 103 used for processing, a NV-RAM (nonvolatile memory) 104 storing various settings about image forming backed up in its internal battery, and a clock IC 105 and all these are connected to each other via a bus.

This controller 100 is connected to: an operation panel 130 including various keys such as a numeric keypad 131 for various entries, a print key 132 and a log-out key 133, and a display 134; an image reader 120 that reads an image on a document; a network interface 160 that serves to exchange various information with external devices connected via the network 4, for example the information processing apparatus 3-y; a printer controller 150 that performs image transcription based on print data received via the network interface 160; and an image output portion 140 that forms the image transcript on paper, respectively, via a bus.

The controller 100 is further connected to a fixed storage 110 via the bus. The fixed storage 110 is a hard disk drive, for example. The fixed storage 110 stores various data, for example information of multiple patterns as to be later described.

[1] Process Routines of the Image Forming Apparatus 1-x

Hereinafter, the processing routines executed by the image forming apparatus 1-x will be described.

[1-1] Main Process Routine of the Image Forming Apparatus 1-x

Figure 3:
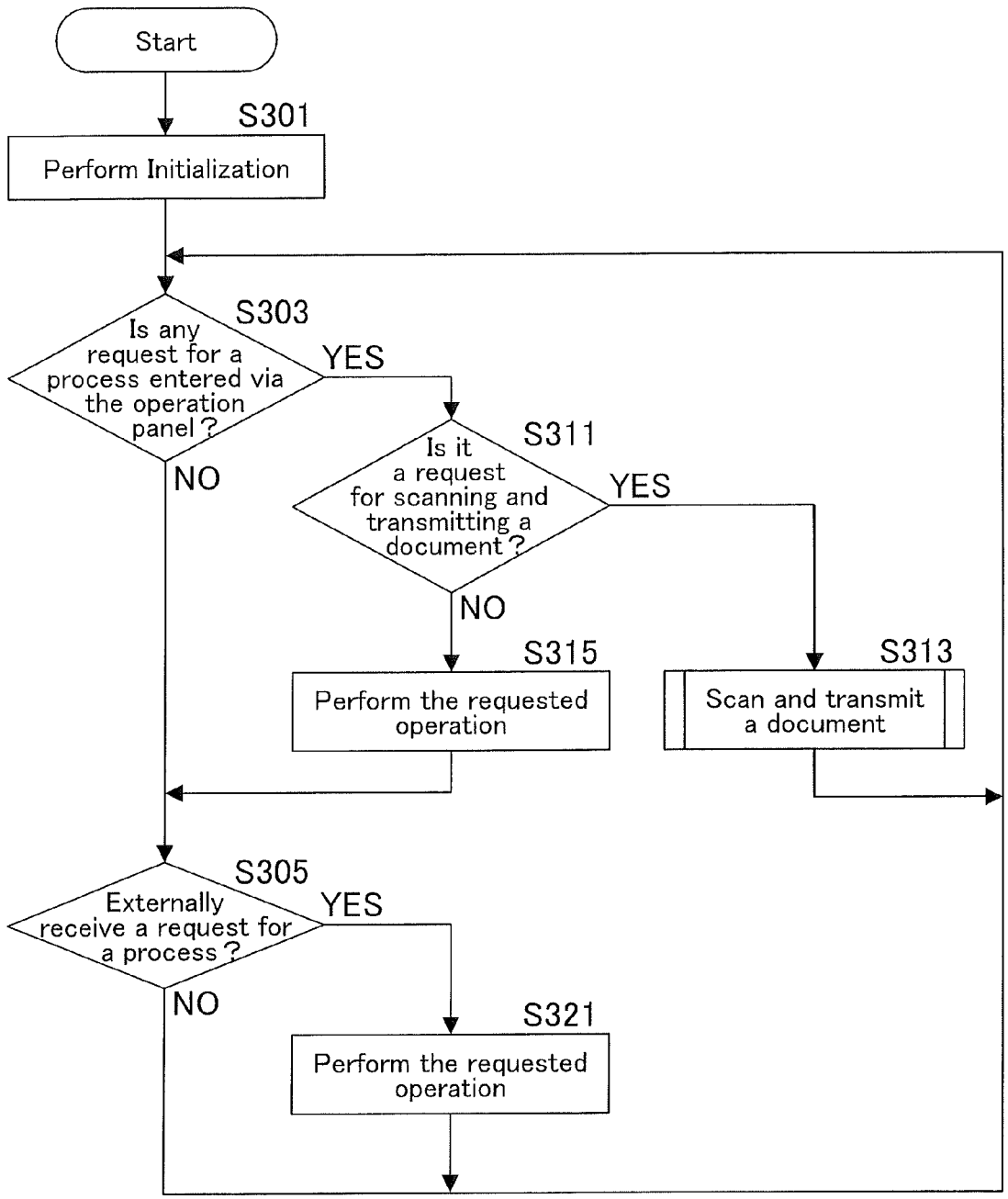
FIG. 3 is a flowchart representing a main processing routine of the image forming apparatuses.

At first, a main processing routine of the image forming apparatus 1-x will be described according to the flowchart shown in FIG. 3.

At occurrence of an event, for example when the power is on, the CPU 101 activates the processing routine. Then the memory is cleared and the setting is initialized, for example returned to the standard mode (Step S301).

When the initialization process is completed, then it is judged whether or not a user entered any request for a process (a request for making a copy, setting or etc.) via the keys and switches on the operation panel 130 and the display 134 of the image forming apparatus 1-x (Step S303). If he/she did not enter any request for a process (NO in Step S303), the routine proceeds to Step S305.

A method of performing display control at firmware update or pattern information copy, will be later described.

If the user entered a request for a process (YES in Step S303), then in Step S311, it is judged whether or not it is a request for scanning and transmitting a document. If it is a request for scanning and transmitting a document (YES in Step S311), the scanning and transmitting process is performed in Step S313.

If it is not a request for scanning and transmitting a document (NO in Step S311), the requested operation is performed in Step S315. Other than scanning and transmitting a document, the operation requested via the keys and switches of the operation panel 130 and the display 134 of the image forming apparatus 1-x may be to copy a document, scan a document, change various settings stored on the NV-RAM 104, or etc. When the requested operation is completed, then the routine proceeds to Step S305.

In Step S305, it is judged whether or not any request for a process (a request for printing a document, setting or etc.) is received via the network 4, from an external device such as the information processing apparatus 3-y. If no such request is received therefrom (NO in Step S305), the routine goes back to Step S303.

If a request for a process is received from an external device (YES in Step S305), the requested operation is performed in Step S321. The operation requested via the external device may be to execute a print job received from the information processing apparatus 3-y, change various settings stored in the NV-RAM 104, or etc. When the requested operation is completed, then the routine goes back to Step S303 to repeat therefrom.

[1-2] Firmware Update

A method of displaying/hiding function buttons on the display 134 of the operation panel 130 when firmware of the image forming apparatus 1-x is updated will be described in details with reference to FIG. 4 through FIG. 7.

FIG. 4 and FIG. 5 show representative examples of a screen with function buttons, displayed on the display 134 of the operation panel 130. Specifically, FIG. 4($a$) and FIG. 5($a$) show screens with a hierarchical menu, displayed when an "Application" tab is selected. On this screen, various function buttons such as a "Sheet/Cover Chapter Insert" button and an "Edit Color" button are displayed. When a user selects one of the function buttons displayed on the screen, the screen is switched to a setting screen for setting a function of the selected function button. This means, in other words, users can use functions of the function buttons displayed on the "Application" tab screen.

An administrator user or etc. can permit users to use functions. When a user operates, only function buttons for use of his/her permitted functions are displayed on the screen, meanwhile function buttons for use of his/her not permitted functions are hidden so that he/she cannot select them.

It is in accordance with pattern information assigned by the administrator user or etc., that a function button is displayed or hidden.

FIG. 6 is a view showing an example of pattern information. As described above, pattern information is stored on the fixed storage 110.

The pattern information has a table including various functions with other functions on a layer one higher or one lower than the various functions as shown in FIG. 6(a), and another table including settings whether to display or hide the function buttons for use of the various functions as shown in FIG. 6(b).

In the example in FIG. 6, Function 1 is a high-layer function of Functions 2 and 3 and Function 2 is a high-layer function of Function 4, meanwhile "Display" is set to the function button for use of Function 1 both for the Basic mode and the Standard mode, that is, Function 1 can be used in either of the modes.

"Display" is set to the function button for use of Function 2 for the Basic mode but "Non-display" is set to this function button for the Standard mode, that is, Function 1 can be used only in the Basic mode.

"Display" is set to the function button for use of Function 3 for the Standard mode but "Non-display" is set to this function button for the Basic mode, that is, Function 3 can be used only in the Standard mode.

Another configuration may be employed, wherein a plurality of functions are classified in groups, and "Display" or "Non-display" is set to each of the groups.

Figure 4A:
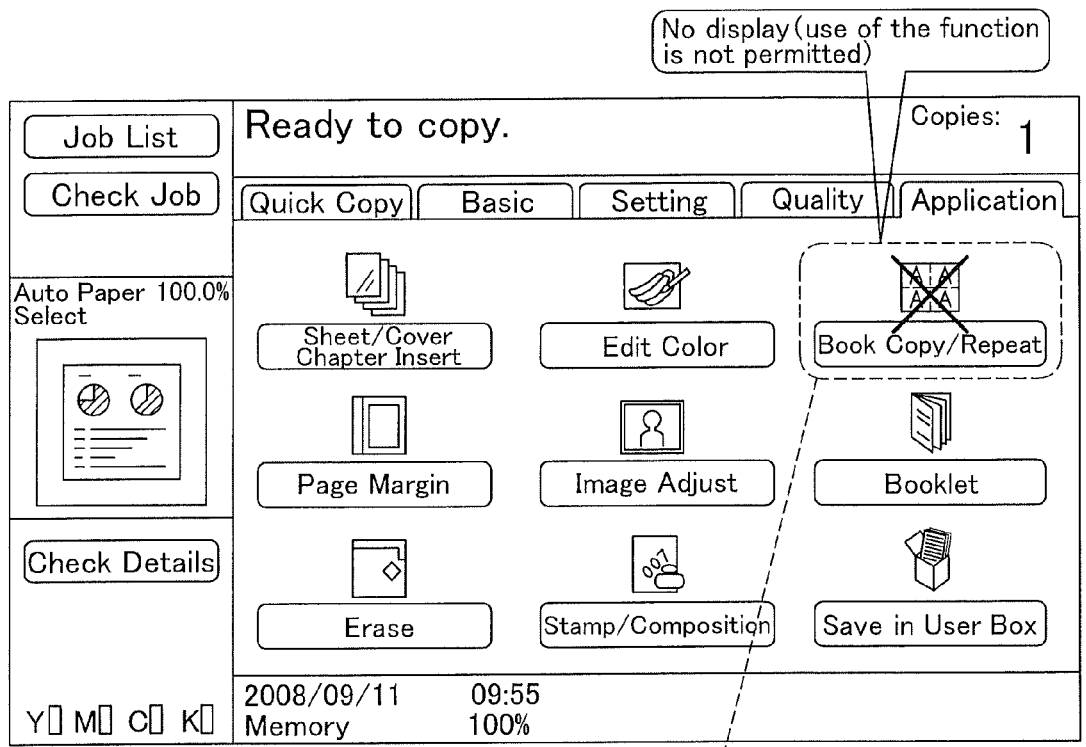
FIG. 4 is a view showing an example of a screen with function buttons, displayed on a display of an operation panel.
Figure 4B:
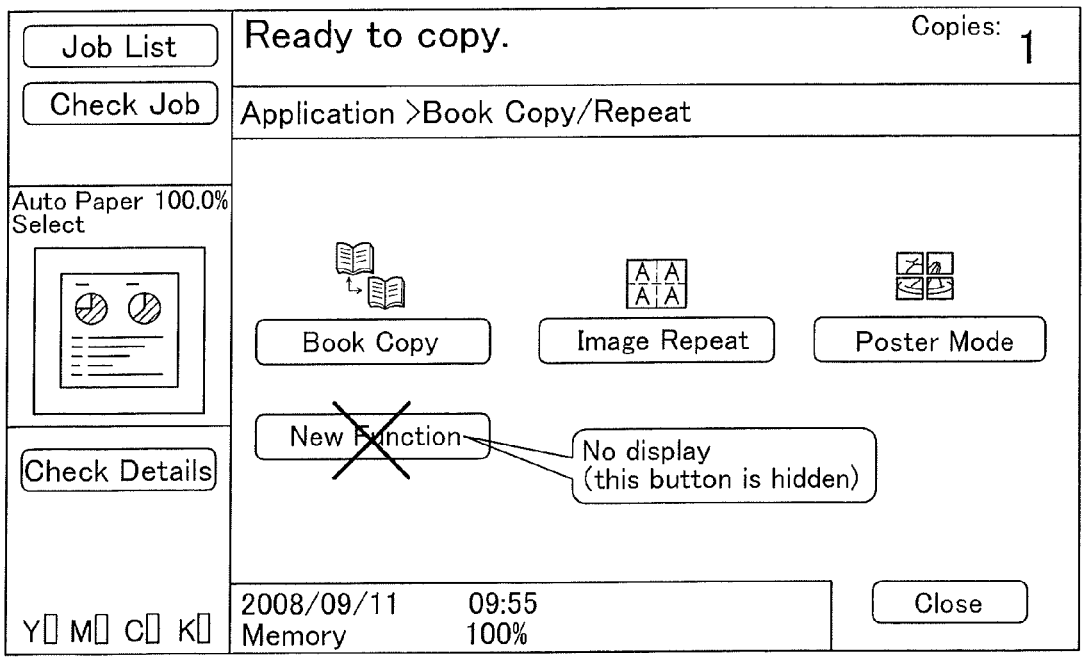
Figure 5A:
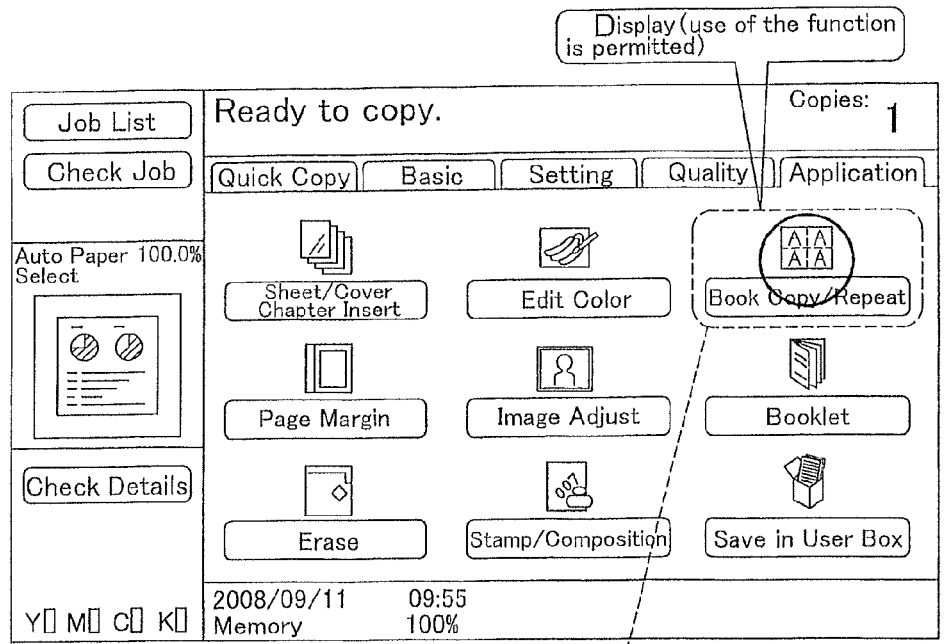
FIG. 5 is a view showing another example of a screen with function buttons, displayed on a display of an operation panel.
Figure 5B:
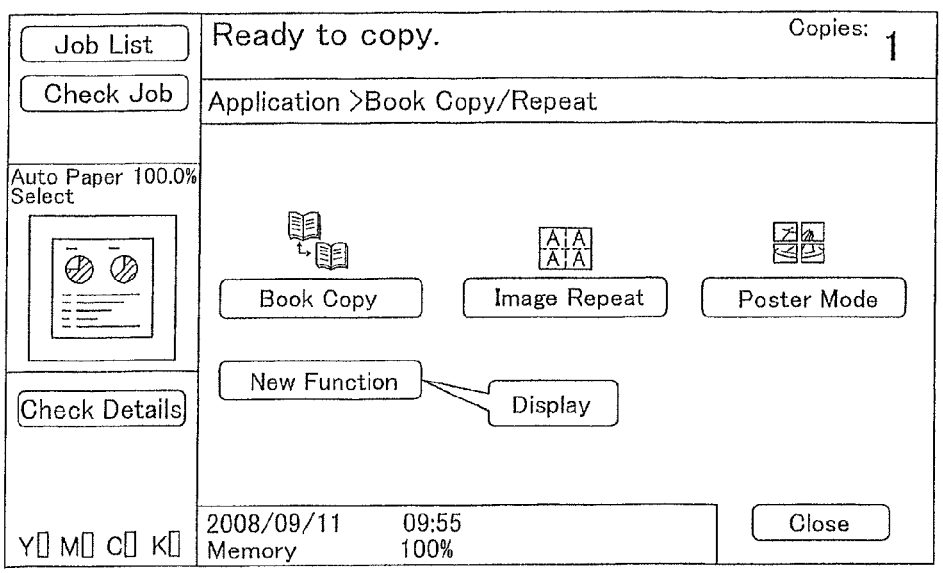

Back to FIG. 4 and FIG. 5, specifically FIG. 4(b) and FIG. 5(b) show examples of a screen that comes up when a user presses a "Book Copy/Repeat" button among the various function buttons displayed on the "Application" tab screen.

In the example in FIG. 4, a new function is added due to firmware update, while the pattern information indicates "Non-display" is set to the function button for use of the function on a higher layer than the new function or the group including this function button.

Here, a user tries to update old firmware with a new one to add a new function via the FIG. 4 (b). The new firmware includes a new function relating to "Book Copy/Repeat" (it is represented by the function button named "New Function" in FIG. 4(b)), however as shown in FIG. 4(a), "Non-display" is set to the "Book Copy/Repeat" button for use of the "Book Copy/Repeat" function that is on a higher layer than the new function (use of this function is not permitted). In this case, not like the screen in FIG. 4(b), in accordance with the setting to hide the function button for use of the higher-layer function or the group including this function button, a control process is performed so that the "New Function" button can be hidden. At the same time, a message telling that a new function is properly added but the function button for use of the new function is hidden, is displayed for the user on the display 134, which is not illustrated in this Figure.

In this example, it should be noted that the screen in FIG. 4(b) never comes up practically in accordance with the setting to hide the "Book Copy/Repeat" button (use of this function is not permitted).

Operations performed when a user tries to update old firmware with a new one to add a new function (hoping to display function buttons for use of the new function and the functions on a layer one higher than the new function), will be later described.

In the example in FIG. 5, a new function is added due to firmware update, while the pattern information indicates "Display" is set to the function button for use of the function on a layer one higher than the new function or the group including this function button. And similar to the example in FIG. 4, the new firmware includes a new function relating to "Book Copy/Repeat" (it is represented by the function button named "New Function" in FIG. 5(b)).

As shown in FIG. 5(a), "Display" is set to the "Book Copy/Repeat" button for use of the "Book Copy/Repeat" function that is on a layer one higher than the new function (use of this function is permitted). In this case, in accordance with the "Display" setting, the "New Function" button is positioned on a predetermined layer. And when the user presses the "New Function" button that additionally appears onto the screen after firmware update, the screen is switched to a setting screen so that he/she can set the new function.

As described above, when a new function is added to the image forming apparatus 1-x due to firmware update, the controller 100 automatically displays or hides the function button for use of the new function, according to the setting whether to display or hide a function button for use of another function on a higher layer than the new function. Therefore, users do not have to mind what functions are installed on the old firmware, on which layers the functions are positioned or where the function button for use of the new function will be additionally displayed after firmware update.

Furthermore, even if a function button for use of a predetermined function is hidden for the purpose of limiting use of an arbitrary user, a user with superior authority, for example an administrator user doesn't have to check or change the setting whether to display or hide the function button after firmware update. In other words, if a new function is added due to firmware update after entry of a user setting, function buttons are displayed or hidden in accordance with the user setting. In this way, the risk that user intentions may be interfered by firmware update can be eliminated.

Figure 7:
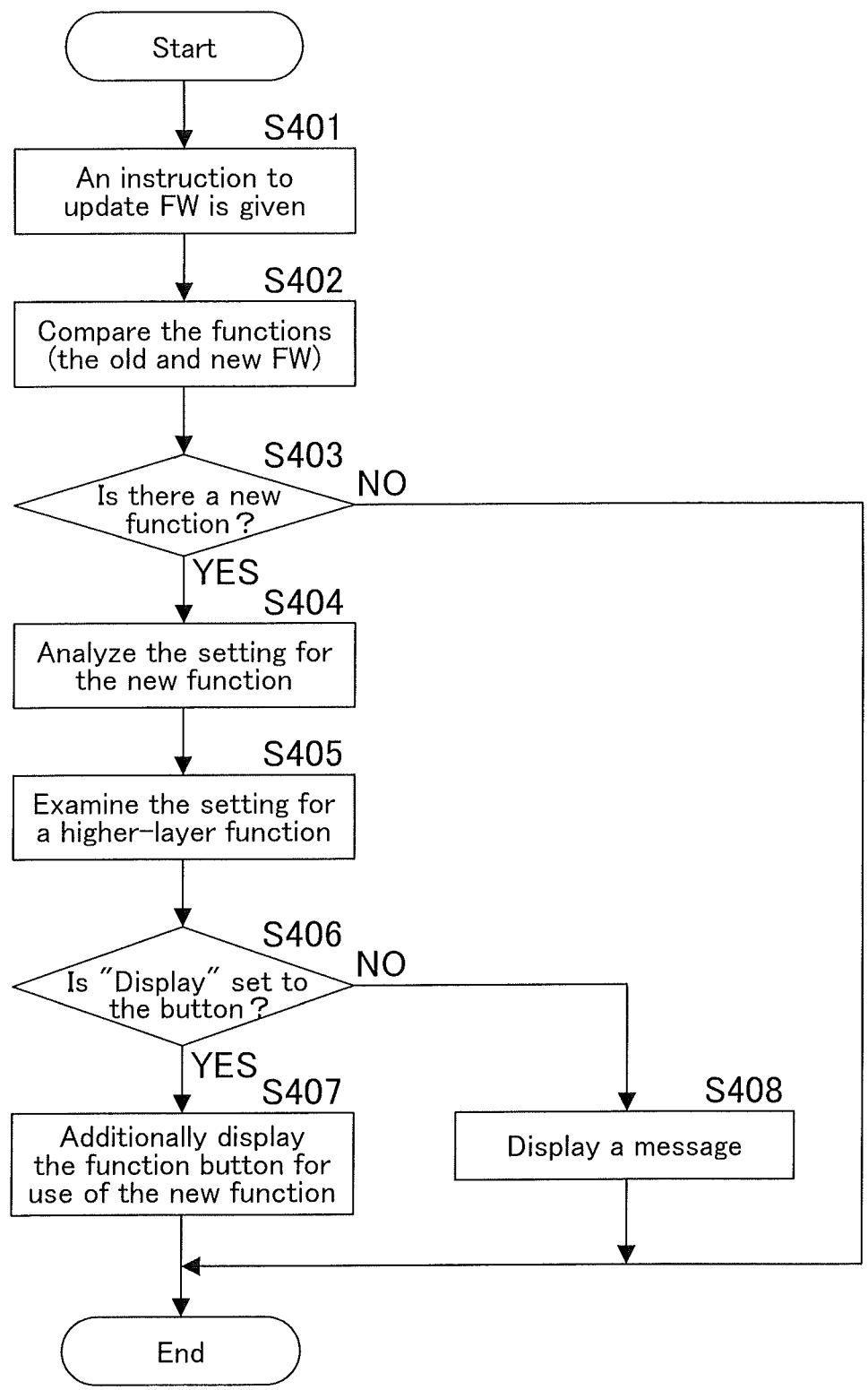
FIG. 7 is a flowchart representing a processing routine to display/hide on the operation panel when firmware of the image forming apparatus is updated.

FIG. 7 is a flowchart representing a processing routine for display control, described with reference to FIG. 4 and FIG. 5. This processing routine is executed by the CPU 101 of the controller 100 of the image forming apparatus 1-x according to a program stored on a recording medium such as the ROM 102.

An instruction to update firmware (FW) is given in Step S401, and the old and new firmwares are compared in terms of the functions installed thereon in Step S402. Then in Step S403, it is judged whether or not there is a new function to add, based on a comparison result.

If there is no new function to add (NO in Step S403), the routine terminates. If there is a new function to add (YES in Step S403), the setting for the new function is analyzed based on pattern information in Step S404, and the setting for another function on a higher layer than the new function is examined in Step S405. Then in Step S406, it is judged whether to display or hide the function button for use of the higher-layer function.

If "Display" is set to the function button (YES in Step S406), the function button for use of the new function additionally appears onto the screen in Step S407. If "Non-display" is set to the function button (NO in Step S406), then in Step S408, the function button for use of the new function is gone while a message telling that a new function is properly added but the function button for use of the new function is gone, appears on the display 134.

[1-2] Firmware Copy (Between Image Forming Apparatuses Having Most Functions in Common)

A method of displaying/hiding function buttons on the display when firmware is copied (exported/imported) among a plurality of image forming apparatuses 1-x will be described with reference to FIG. 8 and FIG. 9.

Figure 8:
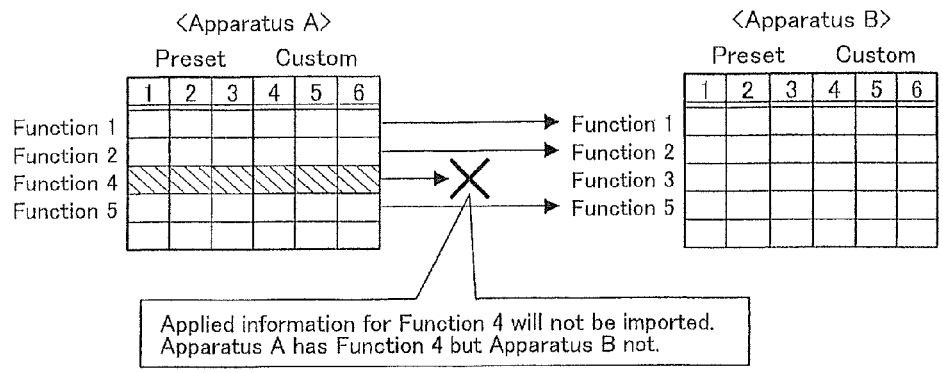
FIG. 8 is a view to explain an example of a process to copy firmware between the image forming apparatuses.

FIG. 8 is a view showing a frame format of copying firmware between different image forming apparatuses.

Apparatus A has Functions 1, 2, 4 and 5. In this Figure, about each of the functions, a screen number of a screen to display the function button for use of the function, position information indicating the function button's position on the screen, and pattern information to determine whether to display or hide the function button are assigned.

In this embodiment of the present invention, the firmware has two areas: "Preset" and "Custom" and each of the areas is capable of storing three types of pattern information. For example, pattern information stored in advance in the "Preset" area may be for pre-shipping, services or administrators so that users can use a type of pattern information suitable for their purpose. Meanwhile, pattern information stored in the "Custom" area can vary by user environmental factor, such as user individual or department. Although in this Figure, three types of pattern information are stored either in the "Preset" area and the "Custom" area, more than three types of pattern information may be stored therein, depending on the memory (the ROM 102 or the S-RAM 103 shown in FIG. 1) of the apparatus.

For example, the pattern information stored in the "Custom—4" area are tried to copy from Apparatus A to Apparatus B. In this example, all the pattern information excluding the one for Function 4 is copied because Apparatus B doesn't have Function 4 and the pattern information for Function 4. Apparatus A (as an exporter) may obtain information about the functions installed on Apparatus B and the pattern information for the functions so as to perform analysis and judge not to copy the pattern information for Function 4, or alternatively Apparatus B (as an importer) may judge not to accept the pattern information for Function 4 when receives copy data. A plurality of types of pattern information stored in the "Custom" area may be copied at one time. Apparatus A may export pattern information to a plurality of apparatuses at one time. How to do with Function 3 of Apparatus B will be later described with reference to FIG. 9.

As described above, users do not have to mind what functions are installed on firmware of Apparatus A and Apparatus B or on which layers the functions are positioned, like in the case of firmware update.

Figure 9:
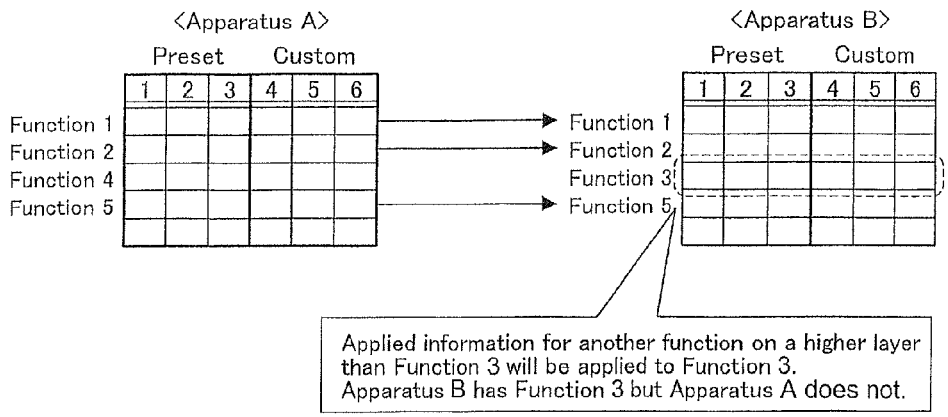
FIG. 9 is a view to explain another example of a process to copy firmware between the image forming apparatuses.

FIG. 9 is a view showing another frame format of copying firmware between different image forming apparatuses like in FIG. 8.

As previously mentioned, Apparatus B has Function 3 that is not installed on Apparatus A. The pattern information for Functions 1, 2 and 5 are copied from Apparatus A to Apparatus B, meanwhile the pattern information for a function on a layer one higher than Function 3 is applied for Function 3. It is only necessary to link a function to another function on a layer one higher than the function so that users can unwind from a troublesome operation after pattern information copy with the functions kept organized on their respective layers in tree.

The pattern information may be copied between Apparatus A and Apparatus B via a network for example a LAN, a portable recording medium, or etc.

Figure 10:
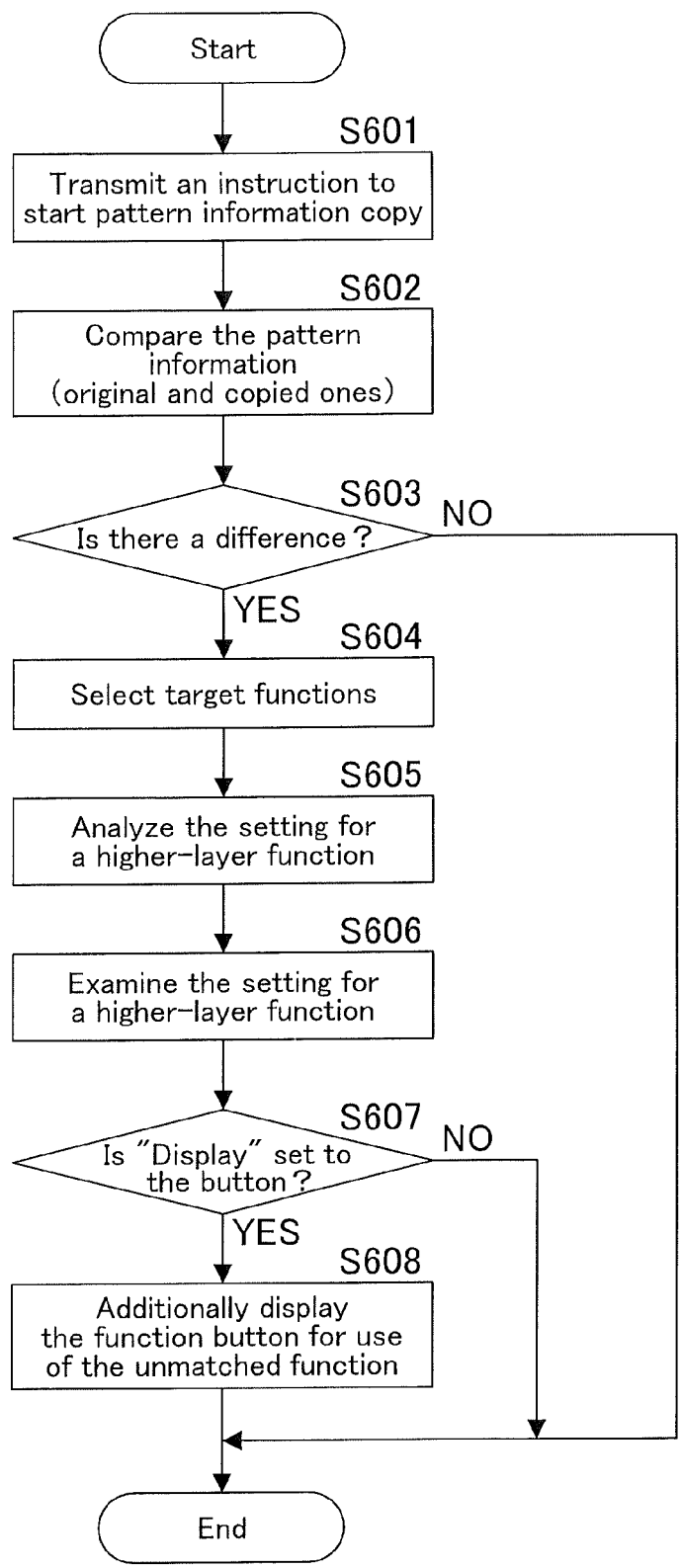
FIG. 10 is a flowchart representing a processing routine described with reference to FIG. 8 and FIG. 9.

FIG. 10 is a flowchart representing a processing routine explained with FIG. 8 and FIG. 9. This processing routine is executed by the CPU 101 of the controller 100 of the image forming apparatus 1-x according to a program stored on a recording medium such as the ROM 102.

In Step S601, an instruction to copy pattern information is given. And the original and copied pattern information are compared in Step S602. Then it is judged in Step S603, whether or not there is a difference between them according to the comparison result.

If there is no difference (NO in Step S603), the routine terminates. If there is a difference (YES in Step S603), target functions are selected and the pattern information for these functions is copied in Step S604. Then in Step S605, an originally installed function that doesn't match any of the copied pattern information is detected and the setting for another function on a higher-layer than the unmatched function is analyzed.

Subsequently it is judged in Step S606, whether to display or hide the function button for use of this higher-layer function, according to the examination result.

If "Display" is set to the function button (YES in Step S607), the function button for use of the unmatched function additionally appears on the screen as shown in step S608. If "Non-display" is set to the function button (NO in Step S607), the routine terminates.

[1-3] Firmware Copy (Between Image Forming Apparatuses Having a Few Functions in Common)

A method of displaying/hiding function buttons on the display when firmware is copied (exported/imported) among a plurality of image forming apparatuses 1-x having a few functions in common will be described with reference to FIG. 11.

Figure 11:
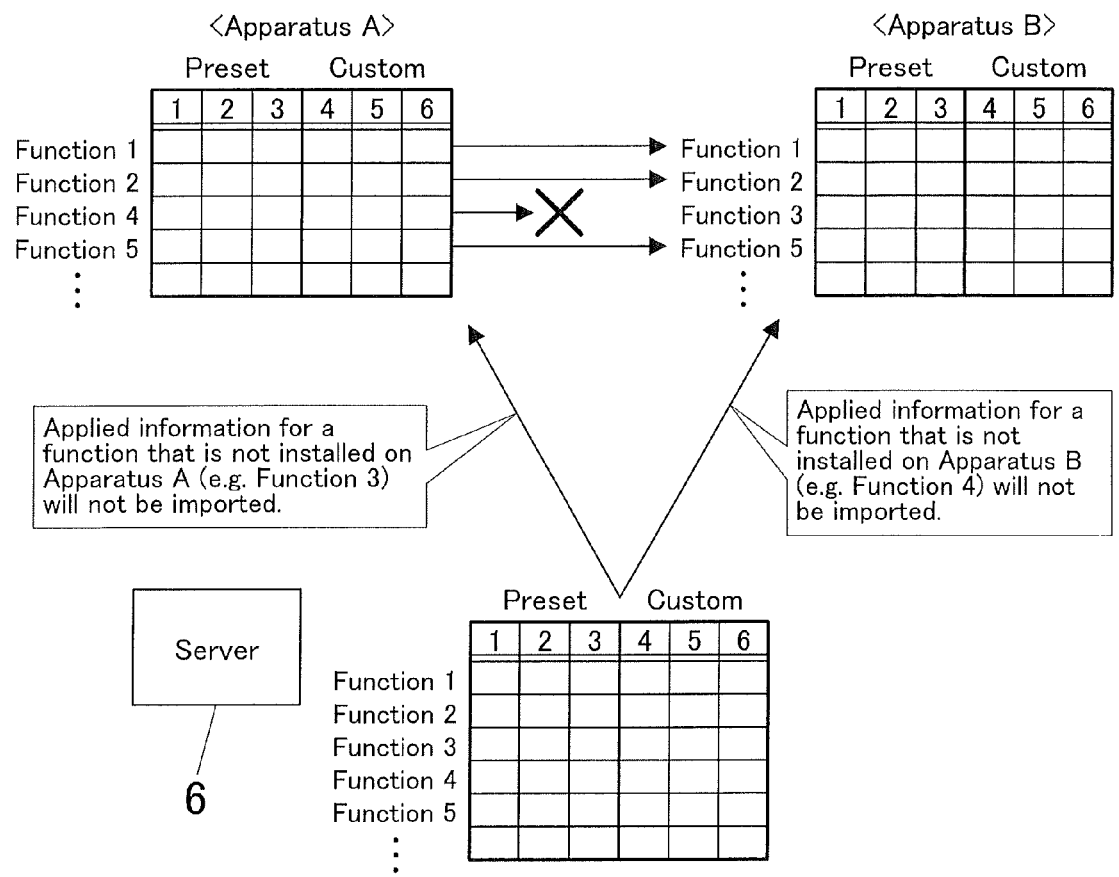
FIG. 11 is a view to explain yet another example of a process to copy firmware between the image forming apparatuses.

FIG. 11 is a view showing a frame format of copying firmware between different image forming apparatuses. In this embodiment, the overall system includes Apparatus A, Apparatus B and a server 6 that consolidates pattern information. Explanation about the terms used therein such as "Preset" and "Custom" is omitted since those are the same as in FIG. 8 and FIG. 9.

If Apparatus A and Apparatus B have a rather large difference in their functions, for example, Apparatus A is a full-color printing machine and Apparatus B is a monochrome printing machine, an administrator or etc. would like to consolidate pattern information with use of the server 6. Apparatus A and Apparatus B accesses the server 6 to obtain only the pattern information for their applicable functions. Apparatus A obtains only the pattern information for Functions 1, 2, 4 and 5 since Function 3 is not necessary. Similarly, the image forming apparatus B obtains only the pattern information for Functions 1, 2, 3 and 5. Apparatus A and Apparatus B (each of them as an importer) may access the server 6 to obtain the pattern information, or alternatively the server 6 (as an exporter) may deliver the pattern information. Ad described above, if image forming apparatuses having a few functions and pattern information in common are provided, pattern information can be consolidated with use of the server 6.

Figure 12:
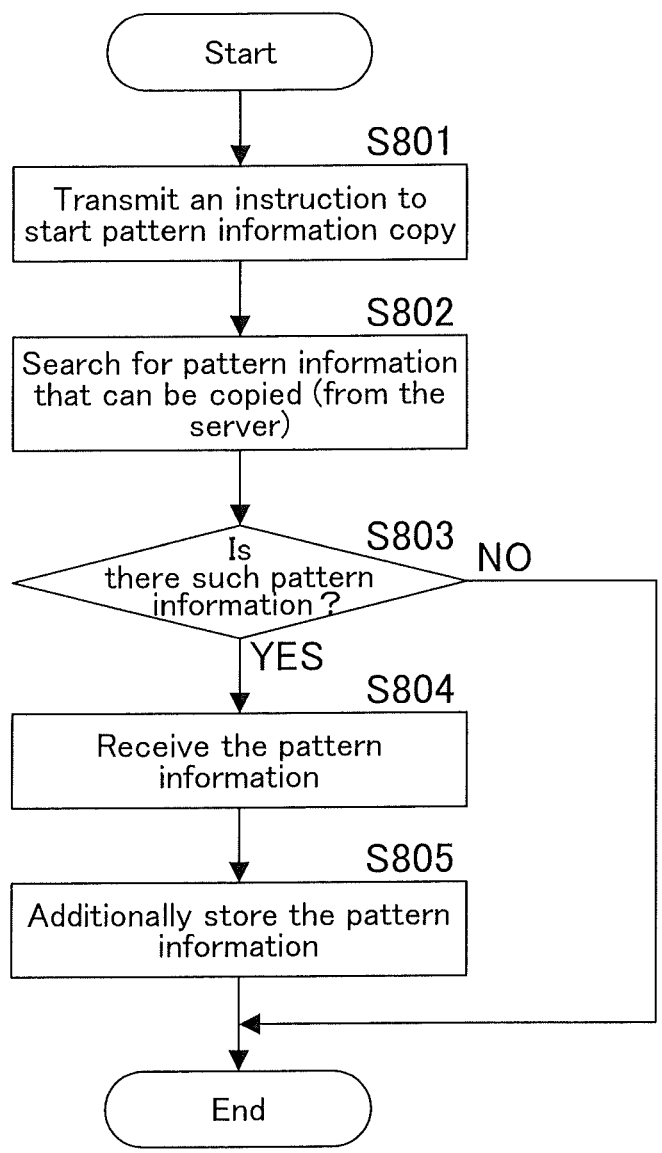
FIG. 12 is a flowchart representing a processing routine described with reference to FIG. 11.

FIG. 12 is a flowchart representing a processing routine described with reference to FIG. 11.

In Step S801, the image forming apparatus as an importer transmits an instruction to start pattern information copy to the server 6. And based on the functions installed on the importer image forming apparatus, pattern information that can be copied from the server 6 is searched for in Step S802. If there is no such pattern information (NO in Step S803), the routine terminates.

If there is such pattern information (YES in Step S803), the server 6 transmits the pattern information to the importer image forming apparatus and the importer image forming apparatus receives the pattern information in Step S804. Then in Step S805, the pattern information is additionally stored.

[1-4] New Function Installation (to Add a New Function Button on the Display)

Another embodiment will be described with reference to FIG. 13 and FIG. 14, wherein users are allowed to set whether to display or hide function buttons (whether or not to permit use of functions) on the display 134 of the operation panel, when a machine is replaced or firmware is updated.

Figure 13A:
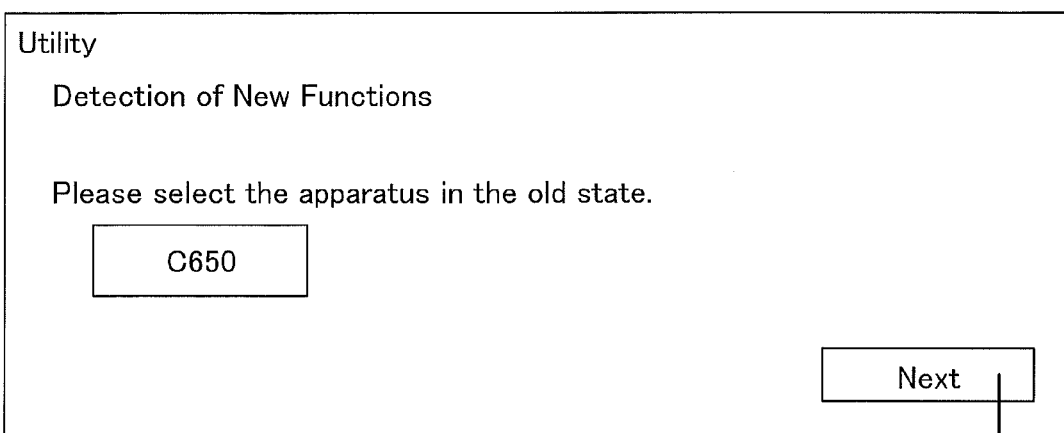
FIG. 13 is a view showing sequential screens to explain how to perform function button display setting when a new function (a new function button) is added.
Figure 14A:
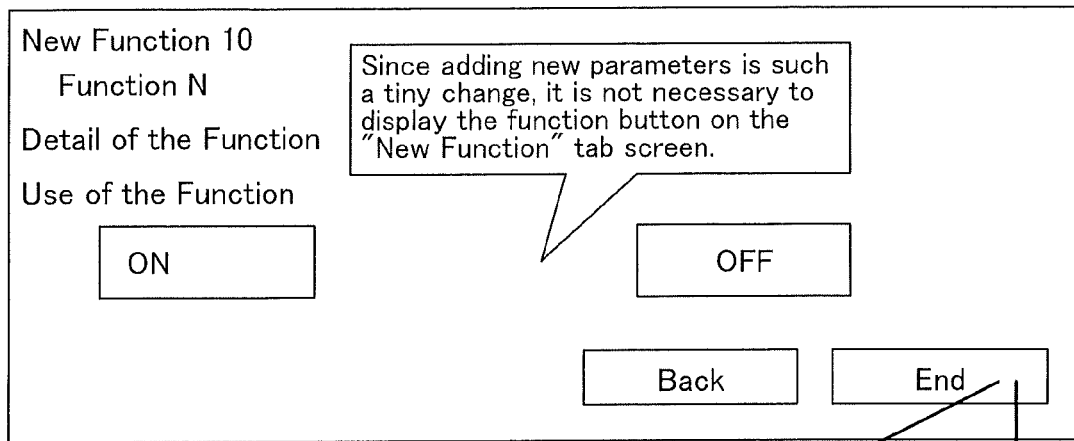
FIG. 14 is a view showing sequential screens continued from FIG. 13.

FIG. 13(a) is a view showing a screen for "Detection of New Functions", which is included in a utility application pre-installed on firmware of the image processing apparatus 1-x.

On this screen, the machine names of the image processing apparatuses are displayed at one view. When a user selects and enters via the screen, the machine name of the user's using image processing apparatus then presses the "Next" button with the intention to firmware update, then the screen is switched to the one shown in FIG. 13(b). Instead of machine names, any other information of the image processing apparatuses, for example model names, IP addresses or telephone numbers if they have the facsimile function, may be displayed on the screen as long as they can be identified one from another with the information. Or alternatively, the information may be a mixture of multiple pieces of information.

The image processing apparatus 1-x identifies the functions installed on the image processing apparatus 1-x itself in the old state before firmware update, by tracing by the machine name of the image processing apparatus 1-x itself in the old state, and analyzes its own functions and the identified functions to detect a difference between them, in other words, detect new functions having just been added. And then the image processing apparatus 1-x allows users to set the detected new functions sequentially from one to another, whether to display or hide the function buttons.

Figure 13B:
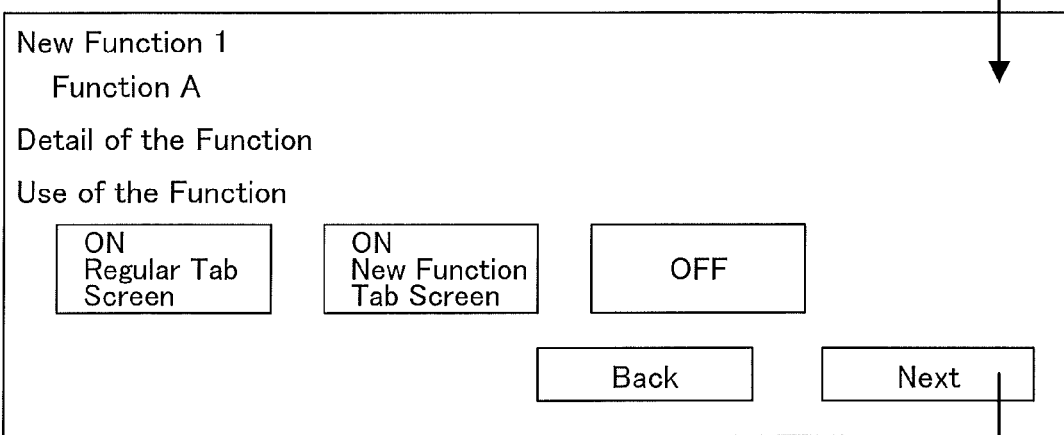

FIG. 13(b) is a view showing a screen for setting a first new function, Function A. On this screen, a plurality of buttons to call out setting screens on which the function button for use of Function A may be displayed, are displayed with the new functions' names and other information, for example detail of the new functions, so that users can easily select among these buttons.

If a user selects the "ON—Regular Tab Screen" button, the function button for use of Function A additionally appears on the base screen (regular screen) for start use of the function, on the display 134 of the operation panel 130. If a user selects the "ON—New Function Tab Screen" button, a new tab named "New Function" to show only a list of the new functions is provided and the function button additionally appears under the tab. If a user selects the "OFF" button, Function A is not installed, and in this case, since the function button for use of Function A is hidden, the user cannot use Function A.

Figure 13C:
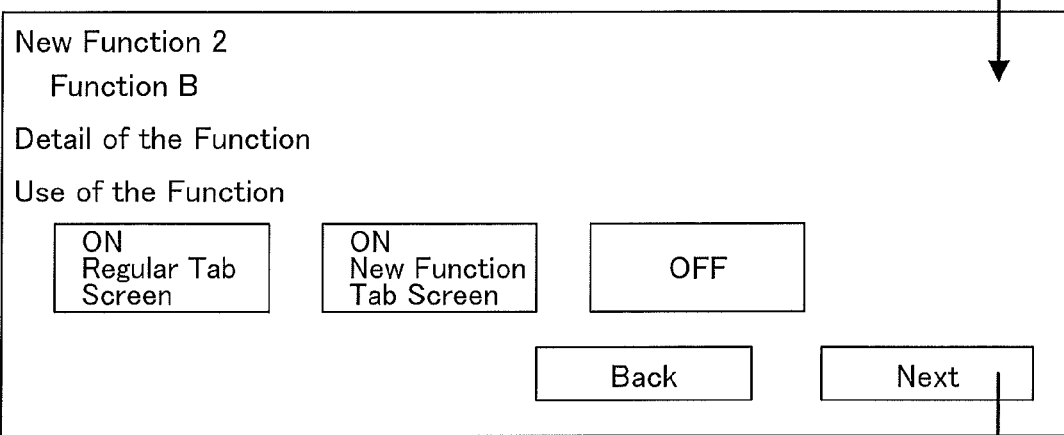

When the user presses the "Next" key on the screen of FIG. 13(b), then the screen is switched to another screen as shown in FIG. 13 (c).

Like on the screen of FIG. 13(b), a plurality of buttons to call out setting screens on which the function button for use of a second new function may be displayed, are displayed with this new function's name and other information, for example an explanation about the new function, on the screen of FIG. 13 (c). And also like the user could do via the screen of FIG. 13(b), he/she can select among these buttons.

After that, these screens for adding and setting new functions are repeatedly displayed while users perform operation via the screens.

Meanwhile, when a new and specific function (for example, parameter values or erasure types) is added, users can simply select "ON" or "OFF", because it is not necessary to display the function button for use of such a tiny function.

Figure 14B:
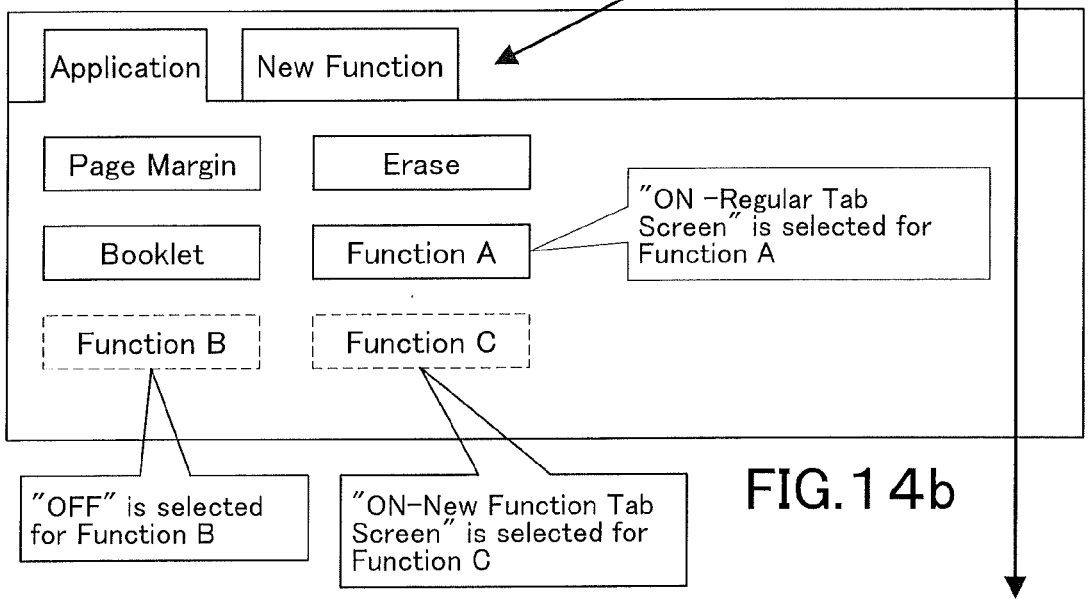

After completion of adding and setting the new functions, the function buttons for use of the new functions are displayed on the display 134 of the operation panel as illustrated in FIGS. 14(b) and (c), and so these are ready for use.

FIG. 14(b) shows a screen that is displayed when the "ON—Regular Tab Screen" button is selected only for Function A in the processing routine described above. Here, as well as the function button for use of Function A, the other function buttons named "Page Margin", "Erase", "Booklet" are displayed on the "Application" tab screen.

Figure 14C:
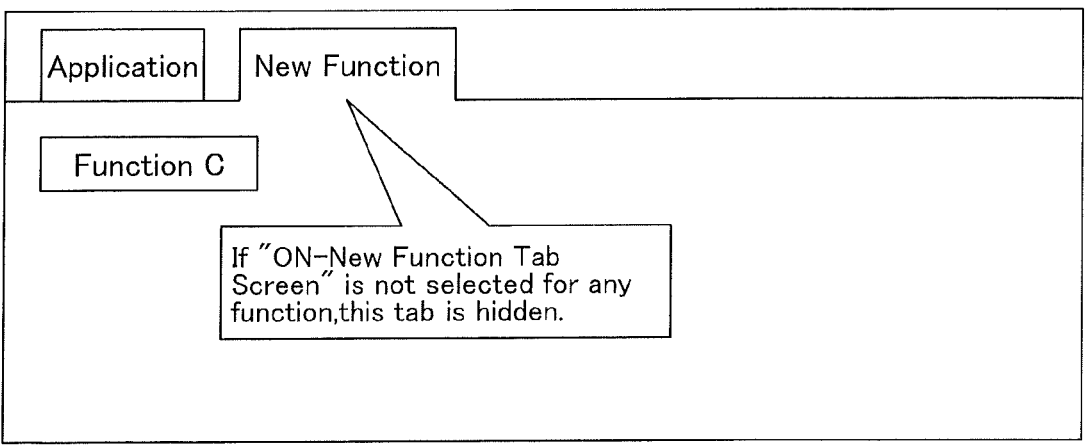

The function button for use of Function B is gone since "OFF" is selected for the function. The function button for use of Function C is not displayed on the screen of FIG. 14(b) but it is displayed on the "New Function" tab screen as illustrated in FIG. 14(c), since "ON—New Function Tab Screen" is selected for the function.

If "ON—New Function Tab Screen" is not selected for any of the new functions, the "New Function" tab is erased or hidden.

As described above, in this embodiment, users are allowed to set whether to display or hide function buttons on the display screen while checking out each function.

Figure 15:
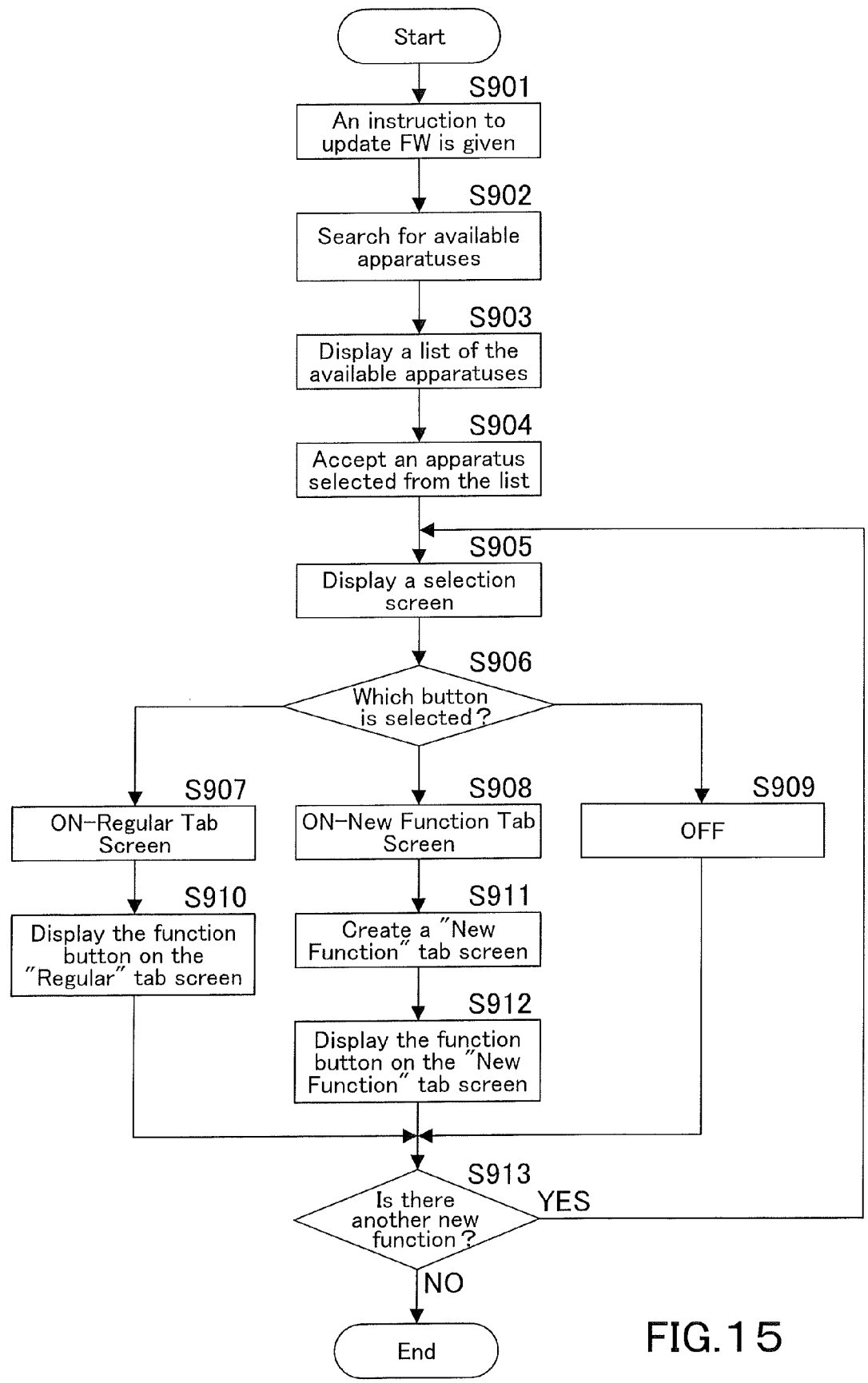
FIG. 15 is a flowchart representing a processing routine to perform function button display setting, executed when a new function (a new function button) is added.

FIG. 15 is flowchart representing the processing routine described with reference to FIG. 13 and FIG. 14. This processing routine is executed by the CPU 101 of the controller 100 of the image forming apparatus 1-x according to a program stored on a recording medium such as the ROM 102.

An instruction to update firmware (FW) is given in Step S901, and the available image forming apparatuses are searched for in Step S902 and a list of the available image forming apparatuses is displayed in Step S903.

Entry of a user selected image forming apparatus is accepted in Step S904, and the present image processing apparatus and the user selected image forming apparatus are compared in terms of their functions. Then in Step S905, the selection screen (illustrated in FIG. 13(b)) is displayed on the display 134 so that the user can select how to do with the function button for use of a new function.

In Step S906, which button is selected by the user is judged. If it is the "ON—Regular Tab Screen" button in Step S907, the function button for use of the new function is displayed on the regular tab screen in Step S910. After that, the routine proceeds to Step S913.

If it is the "ON—New Function Tab Screen" button in Step S908, a "New Function" tab screen is created in Step S911 and the function button for use of the new function is displayed on the "New Function" tab screen in Step S912. After that, the routine proceeds to Step S913.

If it is the "OFF" button in Step S909, the routine directly proceeds to Step S913.

In Step S913, whether or not there is more new function is judged. If there is more new function (YES in Step S913), the routine goes back to Step S905 in which the user can select how to do with the function button for use of the next new function, in order to repeat Steps S905 to S912. If there is no more new function (NO in Step S913), the routine terminates.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. An image processing apparatus comprising:
   a display;
   a controller that displays or hides a function button for use of a function on a display screen on the display according to display information indicating whether to display or hide the function button on the display screen;
   a firmware updater that updates old firmware of the image processing apparatus with new firmware; and
   a comparator that compares the old and new firmware in terms of the functions installed thereon,
   and wherein:
   if the comparison result drawn by the comparator indicates that a new function is added due to the firmware update, the controller displays or hides a first function button for use of the new function according to: (1) display information for a second function button for use of a function on a higher layer than the new function, the new function being subordinate to the higher-layer function, or (2) display information for a group including the second function button, and
   the second function button identifies a function included in the old firmware of the image processing apparatus.

2. The image processing apparatus as recited in claim 1, wherein:
   with press of the second function button when it is displayed on the display screen, another display screen subsequently appears on the display, being accompanied with the first function button on itself.

3. An image processing apparatus comprising:
   a display;
   a controller that displays or hides a function button for use of a function on a display screen on the display according to display information;
   indicating whether to display or hide the function button on the display screen;
   a display information copier that copies the display information from a different image processing apparatus,
   and wherein:
   when there is a function installed on the image processing apparatus which does not match the display information copied by the display information copier, the controller displays or hides a first function button for use of this unmatched function according to the display information copied by the display information copier, the display information indicating whether to display or hide a second function button for use of a function on a higher layer than this unmatched function.

4. The image processing apparatus recited in claim 3, wherein:
   the display information copier copies the display information via a network or a portable recording medium, or alternatively copies the display information from a server.

5. The image processing apparatus recited in claim 3, further comprising:
   a function identification portion that identifies the functions installed on the different image processing apparatus when information of the different image processing apparatus is entered;
   a permitting/prohibiting portion that analyzes the identified functions and the functions originally installed on the image processing apparatus and displays a different function among them on the display, then permits or prohibits use of the different function according to user operation; and
   a button provider that provides the function button for use of the different function on the current display screen or a new display screen according to user operation, if the permitting/prohibiting portion permits use of the different function,
   and wherein:
   the controller displays the function button for use of the different function on the display screen according to the button provider's setting.

6. The image processing apparatus recited in claim 5, wherein:
   the entered information of the different image processing apparatus is at least one from a machine name, model name and IP address thereof.

7. The image processing apparatus as recited in claim 3, wherein:
   with press of the second function button when it is displayed on the display screen, another display screen subsequently appears on the display, being accompanied with the first function button on itself.

8. A method of controlling the display of a function button, comprising:
   displaying or hiding a function button for use of a function on a display screen on a display according to display information indicating whether to display or hide the function button on the display screen;
   updating old firmware with new firmware; and
   comparing the old and new firmware in terms of the functions installed thereon, and wherein:
   if the comparison result indicates that a new function is added due to the firmware update, then a first function button for use of the new function is displayed or hidden according to: (1) display information for a second function button for a function on a higher layer than the new function, the new function being subordinate to the higher-layer function, or (2) display information for a group including the second function button, and the second function button identifies a function included in the old firmware.

9. The method of controlling the display of the function button as recited in claim 8, wherein:

with press of the second function button when it is displayed on the display screen, another display screen subsequently appears on the display, being accompanied with the first function button on itself.

10. A method of controlling the display of a function button, comprising:

displaying or hiding a function button for use of a function on a display screen on a display according to display information indicating whether to display or hide the function button on the display screen; and copying the display information from a different image processing apparatus, and wherein:

when there is a function installed on the image processing apparatus which does not match the display information copied from the different image processing apparatus, a first function button for use of this unmatched function is displayed or hidden according to the display information copied by the display information copier, the display information indicating whether to display or hide a second function button for use of a function on a higher layer than this unmatched function.

11. The method of controlling the display of a function button, recited in claim 10, wherein:

the display information is copied via a network or a portable recording medium, or alternatively copied from a server.

12. The method of controlling the display of a function button, recited in claim 10, wherein:

identifying the functions installed on the different image processing apparatus when information of the different image processing apparatus is entered;

analyzing the identified functions and the functions originally installed on the image processing apparatus and displaying a different function among them on the display;

permitting or prohibiting use of the different function according to user operation; and providing the function button for use of the different function on the current display screen or a new display screen according to user operation, if use of the different function is permitted, and wherein:

the function button for use of the different function is displayed according to the setting determined while button providing.

13. The method of controlling the display of a function button, recited in claim 12, wherein:

the entered information of the different image processing apparatus is at least one from a machine name, model name and IP address thereof.

14. The method of controlling the display of the function button as recited in claim 10, wherein:

with press of the second function button when it is displayed on the display screen, another display screen subsequently appears on the display, being accompanied with the first function button on itself.

15. A nontransitory computer readable medium encoded with a program for controlling the display of a function button, the program making a computer of an image processing apparatus execute:

displaying or hiding a function button for use of a function on a display screen on a display according to display information indicating whether to display or hide the function button on the display screen;

updating old firmware with new firmware; and comparing the old and new firmware in terms of the functions installed thereon, and wherein:

if the comparison result indicates that a new function is added due to the firmware update, then a first function button for use of the new function is displayed or hidden according to: (1) display information for a second function button for use of a function on a higher layer than the new function, the new function being subordinate to the higher-layer function, or (2) display information for a group including the second function button, and the second function button identifies a function included in the old firmware.

16. The nontransitory computer readable medium as recited in claim 15, wherein:

with press of the second function button when it is displayed on the display screen, another display screen subsequently appears on the display, being accompanied with the first function button on itself.

17. A nontransitory computer readable medium encoded with a program for controlling the display of a function button, the program making a computer of an image processing apparatus execute:

displaying or hiding a function button for use of a function on a display screen on a display according to display information indicating whether to display or hide the function button on the display screen; and copying the display information from a different image processing apparatus, and wherein:

when there is a function installed on the image processing apparatus which does not match the display information copied from the different image processing apparatus, a first function button for use of this unmatched function is displayed or hidden according to the display information copied by the display information copier, the display information indicating whether to display or hide a second function button for use of a function on a higher layer than this unmatched function.

18. The nontransitory computer readable medium as recited in claim 17, wherein:

the display information is copied via a network or a portable recording medium, or alternatively copied from a server.

19. The nontransitory computer readable medium as recited in claim 17, the program further making the computer execute:

identifying the functions installed on the different image processing apparatus when information of the different image processing apparatus is entered;

analyzing the identified functions and the functions originally installed on the image processing apparatus and displaying a different function among them on the display;

permitting or prohibiting use of the different function according to user operation; and providing the function button for use of the different function on the current display screen or a new display screen according to user operation, if use of the different function is permitted, and wherein:

the function button for use of the different function is displayed according to the setting determined while button providing.

20. The nontransitory computer readable medium as recited in claim 19, wherein:

the entered information of the different image processing apparatus is at least one from a machine name, model name and IP address thereof.

21. The nontransitory computer readable medium as recited in claim 17, wherein:

with press of the second function button when it is displayed on the display screen, another display screen subsequently appears on the display, being accompanied with the first function button on itself.

* * * * *